US012065995B2

(12) United States Patent
Iizuka et al.

(10) Patent No.: US 12,065,995 B2
(45) Date of Patent: Aug. 20, 2024

(54) FUEL INJECTION DEVICE

(71) Applicant: Hitachi Astemo, Ltd., Hitachinaka (JP)

(72) Inventors: Takatoshi Iizuka, Hitachinaka (JP); Takao Miyake, Hitachinaka (JP); Masashi Sugaya, Hitachinaka (JP)

(73) Assignee: Hitachi Astemo, Ltd, Hitachinaka (JP)

( * ) Notice: Subject to any disclaimer, the term of this patent is extended or adjusted under 35 U.S.C. 154(b) by 0 days.

(21) Appl. No.: 18/281,013

(22) PCT Filed: Feb. 2, 2022

(86) PCT No.: PCT/JP2022/004025

§ 371 (c)(1),
(2) Date: Sep. 8, 2023

(87) PCT Pub. No.: WO2022/239329

PCT Pub. Date: Nov. 17, 2022

(65) Prior Publication Data

US 2024/0151199 A1 May 9, 2024

(30) Foreign Application Priority Data

May 12, 2021 (JP) ................................ 2021-080913

(51) Int. Cl.

*F02M 61/12* (2006.01)
*F02M 45/08* (2006.01)
*F02M 61/18* (2006.01)

(52) U.S. Cl.

CPC ............ *F02M 61/12* (2013.01); *F02M 45/08* (2013.01); *F02M 45/083* (2013.01); *F02M 61/1806* (2013.01)

(58) Field of Classification Search

None
See application file for complete search history.

(56) References Cited

U.S. PATENT DOCUMENTS 5,413,281 A * 5/1995 Hofmann ............. F02M 45/083 239/533.9
5,632,447 A * 5/1997 Christ .................. F02M 61/205 239/533.4

(Continued)

FOREIGN PATENT DOCUMENTS

CN 108474340 A * 8/2018 ............. F02M 51/06
CN 108474340 B * 9/2020 ............. F02M 51/06

(Continued)

OTHER PUBLICATIONS

International Search Report (PCT/ISA/210) issued in PCT Application No. PCT/JP2022/004025 dated Mar. 22, 2022 with English translation (6 pages).

(Continued)

*Primary Examiner* — Kevin R Steckbauer
(74) *Attorney, Agent, or Firm* — Crowell & Moring LLP

(57) ABSTRACT

A fuel injection device includes a nozzle holder; a fixed core; an anchor; and a valve member. The valve member has a plunger rod and a spacer. The plunger rod is provided with a shaft portion, and an engaging portion that engages with the anchor during a valve opening operation. The spacer has an accommodating portion in which the engaging portion is accommodated and forms a predetermined gap between the engaging portion and the anchor when the valve is closed. Further, the accommodating portion and the engaging portion are in line contact or point contact.

7 Claims, 7 Drawing Sheets

(56) References Cited

U.S. PATENT DOCUMENTS

| | | | | | |
|---|---|---|---|---|---|
| 9,422,901 | B2 * | 8/2016 | Suzuki | F02M 51/0685 | |
| 9,920,726 | B2 * | 3/2018 | Suzuki | F02M 51/0685 | |
| 10,400,723 | B2 * | 9/2019 | Suzuki | F02M 51/0653 | |
| 10,808,662 | B2 * | 10/2020 | Yamamoto | F02M 61/161 | |
| 11,242,831 | B2 * | 2/2022 | Yamamoto | F02M 51/06 | |
| 2011/0315908 | A1 * | 12/2011 | Brace | F02M 45/08 | 251/321 |
| 2013/0214066 | A1 * | 8/2013 | Suzuki | F02M 51/0653 | 239/585.5 |
| 2014/0346382 | A1 * | 11/2014 | Scheffel | F16K 31/06 | 251/129.15 |
| 2016/0097358 | A1 * | 4/2016 | Miyake | F02M 51/066 | 239/585.1 |
| 2016/0160821 | A1 * | 6/2016 | Suzuki | F02M 51/0685 | 239/585.5 |
| 2018/0163681 | A1 * | 6/2018 | Suzuki | F02M 51/0685 | |
| 2019/0003436 | A1 * | 1/2019 | Yasukawa | F02M 51/0671 | |
| 2019/0024618 | A1 * | 1/2019 | Yamamoto | F02M 51/0664 | |
| 2020/0224621 | A1 * | 7/2020 | Yamamoto | F02M 51/0682 | |
| 2023/0228238 | A1 * | 7/2023 | Matsutake | F02M 61/10 | 239/584 |

FOREIGN PATENT DOCUMENTS

| | | | | | |
|---|---|---|---|---|---|
| DE | 102005012929 | A1 * | 9/2006 | | F02M 45/083 |
| DE | 112016005303 | T5 * | 8/2018 | | F02M 51/06 |
| DE | 112018004339 | T5 * | 5/2020 | | F02M 51/06 |
| DE | 102022206350 | A1 * | 1/2024 | | F02M 21/0206 |
| EP | 1705365 | A2 * | 9/2006 | | F02M 45/083 |
| EP | 1705365 | B1 * | 11/2010 | | F02M 45/083 |
| GB | 2424451 | A * | 9/2006 | | F02M 45/086 |
| JP | 62-199965 | A | 9/1987 | | |
| JP | 4587259 | B2 * | 11/2010 | | F02M 45/083 |
| JP | 2013199924 | A * | 10/2013 | | F02M 51/0653 |
| JP | 5965253 | B2 * | 8/2016 | | F02M 51/0653 |
| JP | 2017-48731 | A | 3/2017 | | |
| JP | 2017-53253 | A | 3/2017 | | |
| JP | 2017048731 | A * | 3/2017 | | F02M 51/0607 |
| JP | 2017125406 | A * | 7/2017 | | F02M 51/06 |
| JP | 2019065850 | A * | 4/2019 | | F02M 51/06 |
| JP | 6668079 | B2 * | 3/2020 | | F02M 51/06 |
| JP | 6724959 | B2 * | 7/2020 | | F02M 51/06 |
| JP | 2020-186704 | A | 11/2020 | | |
| JP | 2020186704 | A * | 11/2020 | | |
| WO | WO-2017037973 | A1 * | 3/2017 | | F02M 51/0607 |
| WO | WO-2017097777 | A1 * | 6/2017 | | F02M 45/083 |
| WO | WO-2017122421 | A1 * | 7/2017 | | F02M 51/06 |
| WO | WO 2018/135264 | A1 | 7/2018 | | |
| WO | WO-2018135264 | A1 * | 7/2018 | | |
| WO | WO-2019065412 | A1 * | 4/2019 | | F02M 51/06 |
| WO | WO-2023247088 | A1 * | 12/2023 | | F02M 21/0206 |

OTHER PUBLICATIONS

Japanese-language Written Opinion (PCT/ISA/237) issued in PCT Application No. PCT/JP2022/004025 dated Mar. 22, 2022 (4 pages).

* cited by examiner

FUEL INJECTION DEVICE

TECHNICAL FIELD

The present invention relates to a fuel injection device.

BACKGROUND ART

Conventionally, a cylinder injection-type internal combustion engine that uses a fuel injection device to inject fuel directly into a cylinder is used as an internal combustion engine. Furthermore, in recent years, from the viewpoint of reducing exhaust gas, the ability to inject fuel in multiple stages at a high pressure and suppress variations in the fuel injection amount during low pulses is a requirement.

The technology disclosed in Patent Literature 1, for example, exists as technology relating to a conventional fuel injection device. Patent Literature 1 discloses technology that includes a magnetic core, an anchor attracted by the magnetism of the magnetic core, a first flange-shaped portion on which the anchor abuts, a valve body provided downstream of the first flange-shaped portion, and a projecting portion provided upstream of the first flange-shaped portion. Further, Patent Literature 1 discloses technology that includes a rod head provided upstream of the projecting portion, an intermediate member that forms a gap between the first flange-shaped portion and the anchor in a closed-valve state, and a winding spring disposed between the rod head and the intermediate member.

CITATION LIST

Patent Literature

PTL 1: JP 2020-186704 A

SUMMARY OF INVENTION

Technical Problem

However, in the technology disclosed in Patent Literature 1, a dimensional error in the size of the gap formed between the valve body and the intermediate member arises between individual fuel injection devices. The dimensional error of the gap formed between the valve body and the intermediate member affects a valve opening operation of the valve body. Furthermore, in the technology disclosed in Patent Literature 1, a valve-body stepped portion and the intermediate member become stuck during the valve opening operation, which affects the valve opening operation of the valve body. As a result, in the technology disclosed in Patent Literature 1, variations arise in the fuel injection amount.

In view of the above problems, an object of the present invention is to provide a fuel injection device capable of suppressing variations in a fuel injection amount.

Solution to Problem

In order to solve the above problems and achieve the object of the present invention, a fuel injection device includes a nozzle holder; a fixed core; an anchor; and a valve member. The nozzle holder is provided with an injection hole-forming member. The fixed core is disposed in the nozzle holder. The anchor is disposed opposite the fixed core. The valve member is movably disposed in the nozzle holder.

The valve member has a plunger rod and a spacer. The plunger rod is provided with a shaft portion that opens and closes an injection hole provided in the injection hole-forming member, and an engaging portion that engages with the anchor during a valve opening operation. The spacer has an accommodating portion in which the engaging portion is accommodated and forms a predetermined gap between the engaging portion and the anchor when the valve is closed. Further, the accommodating portion and the engaging portion are in line contact or point contact.

Advantageous Effects of Invention

The fuel injection device having the above configuration enables suppression of variations in a fuel injection amount.

DESCRIPTION OF EMBODIMENTS

Figure 1:
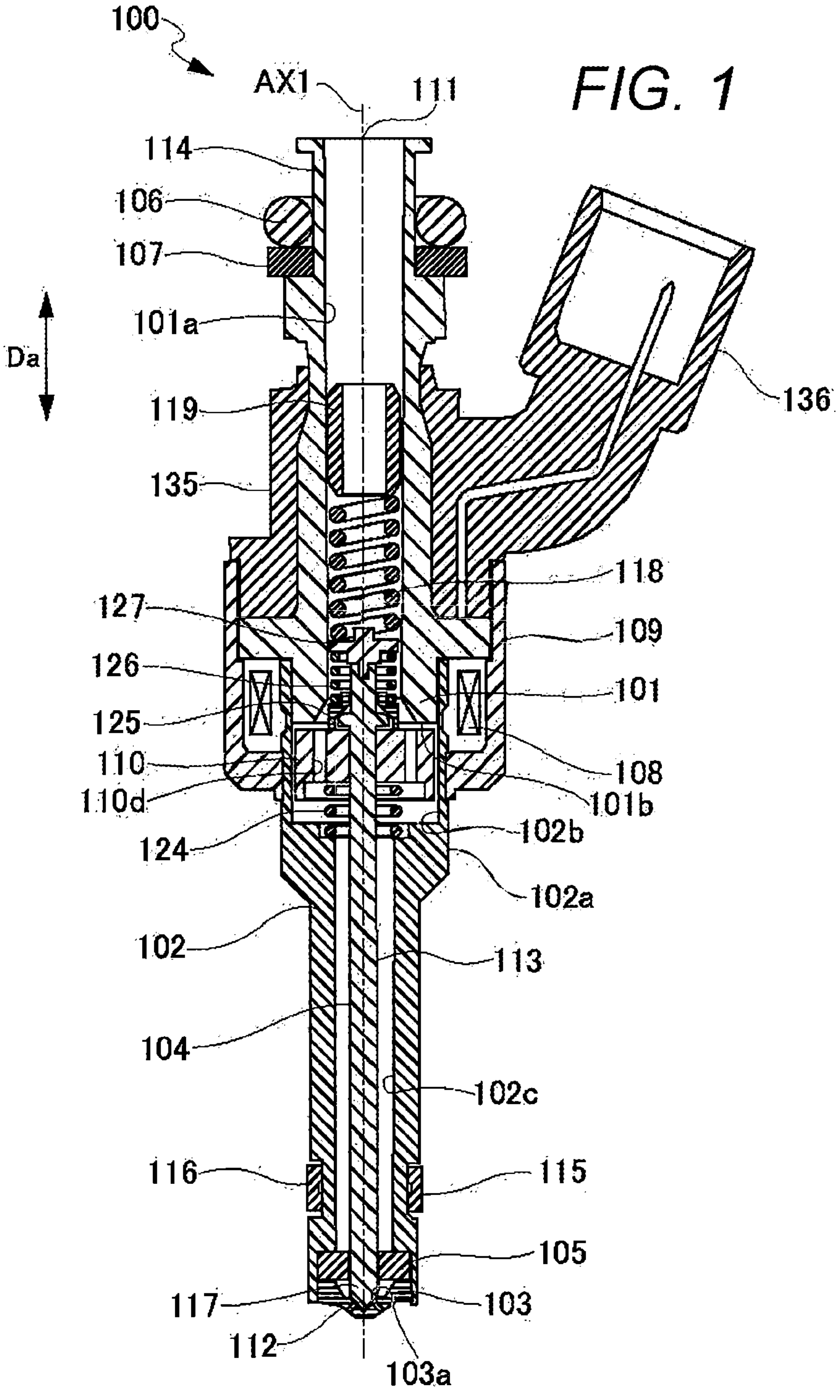
FIG. 1 is a cross-sectional view illustrating a fuel injection device according to a first embodiment.

Hereinafter, embodiments of a fuel injection device will be described with reference to FIGS. 1 to 7. Note that, in the drawings, the same members are denoted by the same reference signs.

1. First Embodiment

1-1. Configuration of Fuel Injection Device

First, a configuration of a fuel injection device according to a first embodiment (hereinafter referred to as "the present example".) will be described with reference to FIG. 1.

FIG. 1 is a cross-sectional view illustrating the fuel injection device.

The fuel injection device illustrated in FIG. 1 is used as an internal combustion engine in a four-cycle engine in which four strokes, namely an intake stroke, a compression stroke, a combustion (expansion) stroke, and an exhaust stroke, are repeated. In addition, the fuel injection device is applied to a cylinder injection-type internal combustion engine that injects fuel into each cylinder of the cylinders.

As illustrated in FIG. 1, the fuel injection device 100 includes a fixed core (magnetic core) 101, a nozzle holder 102, an injection hole-forming member 103, a valve member 104, an electromagnetic coil 108, a housing 109, an anchor (movable core) 110, and a connecting portion 135. The fuel injection device 100 includes a first spring 118, a second spring 124, and a third spring 126.

[Nozzle Holder]

The nozzle holder 102 is formed in a tubular shape. The injection hole-forming member 103 is attached, through insertion or press-fitting, to a distal end portion, which is one end portion of the nozzle holder 102 in an axial direction Da "hereinafter simply referred to as the "axial direction Da"" along a central axis 100*a*. An injection hole 112 for injecting fuel is formed in the injection hole-forming member 103.

A valve seat 103*a*, from/with which the distal end portion of a valve body 117 of the valve member 104 (described below) separates/makes contact, is formed in the injection hole-forming member 103, and the injection hole-forming member 103 seals the fuel when the valve body 117 is seated on the valve seat 103*a*. In addition, the valve body 117 seals the fuel by abutting on the valve seat 103*a*, and permits the passage of the fuel by separating from the valve seat 103*a*.

A guide member 105 is fixed to the distal end portion of the nozzle holder 102 through press-fitting or plastic coupling. The guide member 105 supports an outer peripheral surface of the valve body 117 in the valve member 104 and guides the movement of the valve body 117.

A large-diameter portion 102*a* having an outer diameter larger than that of the distal end portion is formed at a rear end portion, which is the other end portion of the nozzle holder 102 in the axial direction Da. An accommodating recess 102*b* is formed in the large-diameter portion 102*a*. The accommodating recess 102*b* communicates with the distal end portion by means of a communication hole 102*c* formed along the axial direction Da of the nozzle holder 102.

The accommodating recess 102*b* is a bottomed recess that is open on the rear end side of the large-diameter portion 102*a* and recessed toward the distal end side in the axial direction Da. The anchor 110 (described below) and a portion of the fixed core 101 are arranged in the accommodating recess 102*b*. One end portion of the second spring 124 is accommodated in the central portion of the bottom portion of the accommodating recess 102*b*. The accommodating recess 102*b* slidably supports, on an inner wall surface thereof, the anchor 110 (described below) along the axial direction Da.

A groove 115 is formed in a downstream outer peripheral portion (a radially outer side) of the nozzle holder 102, and a seal member 116 typified by a resin-made chip seal is fitted into the groove 115.

[Valve Member]

The valve member 104 is disposed inside the nozzle holder 102 so as to be movable along the axial direction Da. The valve member 104 includes a plunger rod 113, a spacer 125, the third spring 126, and a rod head 127. Note that a detailed configuration of the valve member 104 will be described below.

[Anchor]

Next, the anchor 110 will be described. The anchor 110 is disposed between the spacer 125 of the valve member 104 and the bottom portion of the accommodating recess 102*b* in the accommodating recess 102*b* of the nozzle holder 102. In addition, a minute gap is formed between the outer peripheral surface of the anchor 110 and the inner peripheral surface of the accommodating recess 102*b*. Therefore, the anchor 110 is arranged to be movable along the axial direction Da in the accommodating recess 102*b*.

The anchor 110 is formed in a cylindrical shape. An insertion hole 110*c* (see FIG. 2) and an eccentric through-hole 110*d* are formed in the anchor 110. The insertion hole 110*c* and the eccentric through-hole 110*d* are guide holes penetrating the anchor 110 from the distal end portion to the rear end thereof in the axial direction Da. The insertion hole 110*c* is formed on the central axis of the anchor 110. The plunger rod 113 of the valve member 104 is inserted into the insertion hole 110*c*.

The eccentric through-hole 110*d* is formed in a position eccentric from the central axis of the anchor 110. The eccentric through-hole 110*d* communicates with a flow path formed by a through-hole 101*a* of the fixed core 101. The eccentric through-hole 110*d* forms a flow path through which the fuel passes.

The rear end portion of the second spring 124 abuts on the end surface of the anchor 110 on the distal end side in the axial direction Da. Therefore, the second spring 124 is interposed between the anchor 110 and the accommodating recess 102*b* of the nozzle holder 102. The fixed core 101 is disposed on the rear end side of the anchor 110 in the axial direction Da.

[Fixed Core]

The fixed core 101 is a member that attracts the anchor 110 by using a magnetic attraction force. The fixed core 101 is formed in a substantially cylindrical shape having irregularities on an outer peripheral surface thereof. The distal end portion of the fixed core 101 in the axial direction Da is press-fitted inside the large-diameter portion 102*a* of the nozzle holder 102, that is, into the accommodating recess 102*b*. The nozzle holder 102 and the fixed core 101 are joined by welding. Thus, a gap between the nozzle holder 102 and the fixed core 101 is sealed, and the space inside the nozzle holder 102 is sealed.

In addition, the distal end portion 101*b* of the fixed core 101 lies opposite an end surface (upper end surface 110*a*) on the other end side in the axial direction Da of the anchor 110 arranged in the accommodating recess 102*b*. Note that the rear end side of the fixed core 101 in the axial direction Da protrudes from the accommodating recess 102*b* of the nozzle holder 102 toward the rear end in the axial direction Da.

The through-hole 101*a* is formed in the fixed core 101. The through-hole 101*a* is formed coaxially with the central axis 100*a*. The through-hole 101*a* forms a flow path through which fuel passes. A fuel supply port 111, which communicates with the through-hole 101*a*, is formed at the rear end of the fixed core 101 in the axial direction Da. Fuel is introduced from the fuel supply port 111 toward the through-hole 101*a*.

Furthermore, a first spring 118 and an adjustment member 119 are arranged on the distal end portion side of the through-hole 101*a* in the axial direction Da. The first spring 118 is disposed on the distal end portion side of the through-hole 101*a* with respect to the adjustment member 119. The adjustment member 119 is press-fitted into the through-hole 101*a* and fixed inside the fixed core 101. The rod head 127, the third spring 126, and the spacer 125 of the valve member 104 are inserted into the through-hole 101*a*. The through-hole 101*a* slidably supports the rod head 127 of the valve member 104 (described below) along the axial direction Da.

The first spring 118 is interposed between the adjustment member 119 and the rod head 127 of the valve member 104. The first spring 118 biases the valve member 104 in the axial direction Da toward the distal end portion of the nozzle holder 102.

In addition, the biasing force exerted by the first spring 118 on the valve member 104 can be adjusted by adjusting the fixing position of the adjustment member 119 with respect to the fixed core 101. Thus, it is possible to adjust an initial load with which the valve body 117, which is the distal end portion of the plunger rod 113 in the valve member 104, presses against the valve seat 103*a* provided to the injection hole-forming member 103 of the nozzle holder 102.

Here, the biasing force by which the first spring 118 biases the valve member 104 toward the distal end portion of the nozzle holder 102 is set larger than the biasing force by which the second spring 124 biases the anchor 110 toward the fixed core 101.

A fuel filter (not illustrated) is provided to an upstream inner peripheral portion (a radially inner side) of the fixed core 101. A seal member 106 represented by an O-ring is attached to an upstream outer peripheral portion (radially outer side) 114 of the fixed core 101, and a protective member 107 for protecting the seal member 106 is attached to a downstream side thereof. The seal member 106 seals a gap between the inner peripheral surface of the fuel pipe (not illustrated) and the upstream outer peripheral portion 114 of the fixed core 101, and prevents leakage of fuel flowing through the fuel pipe.

[Coil]

Next, an electromagnetic coil 108 will be described. The electromagnetic coil 108 is wound around a cylindrical coil bobbin. Further, the electromagnetic coil 108 is wound around a coil bobbin and arranged so as to cover a portion of the outer peripheral surface of the large-diameter portion 102*a* of the nozzle holder 102 and a portion of the outer peripheral surface of the distal end portion of the fixed core 101. The end portion at the start of winding and the end portion at the end of winding of the electromagnetic coil 108 are connected to a power supply terminal of a connector 136 of the connecting portion 135 described below via wiring (not illustrated). The housing 109 is fixed to the outer periphery of the electromagnetic coil 108.

[Housing]

The housing 109 is formed in a bottomed cylindrical shape. A fitting hole is formed in the bottom portion, which is the distal end portion of the housing 109 in the axial direction Da. The fitting hole is formed in a central portion of the bottom portion. The nozzle holder 102 is inserted into the fitting hole. The open edge of the fitting hole and the outer peripheral surface of the nozzle holder 102 are welded together, for example, over the entire circumference. Thus, the nozzle holder 102 is fixed to the housing 109.

The housing 109 is disposed so as to surround the distal end portion side of the fixed core 101, the coil bobbin, and the outer periphery of the electromagnetic coil 108. The inner peripheral surface of the housing 109 lies opposite the nozzle holder 102 and the electromagnetic coil 108 to form an outer peripheral yoke portion. As described above, a magnetic circuit that includes the fixed core 101, the anchor 110, the nozzle holder 102, and the housing 109 is formed around the electromagnetic coil 108.

[Connecting Portion]

The connecting portion 135 is formed of resin. The connecting portion 135 fills the space between the fixed core 101 and the housing 109. Further, the connecting portion 135 covers the outer peripheral surface excluding the rear end portion of the fixed core 101 on the rear end side in the axial direction Da with respect to the housing 109. The connecting portion 135 is molded so as to form the connector 136, which has a power supply terminal. The terminal is connected to a connection terminal of a plug (not illustrated). Thus, the fuel injection device 100 is connected to a high-voltage power supply or a battery power supply. Energization of the electromagnetic coil 108 is controlled by an engine control unit (ECU).

1-2. Detailed Configuration of Valve Member

Next, a detailed configuration of the valve member 104 will be described with reference to FIGS. 1 and 2.

Figure 2:
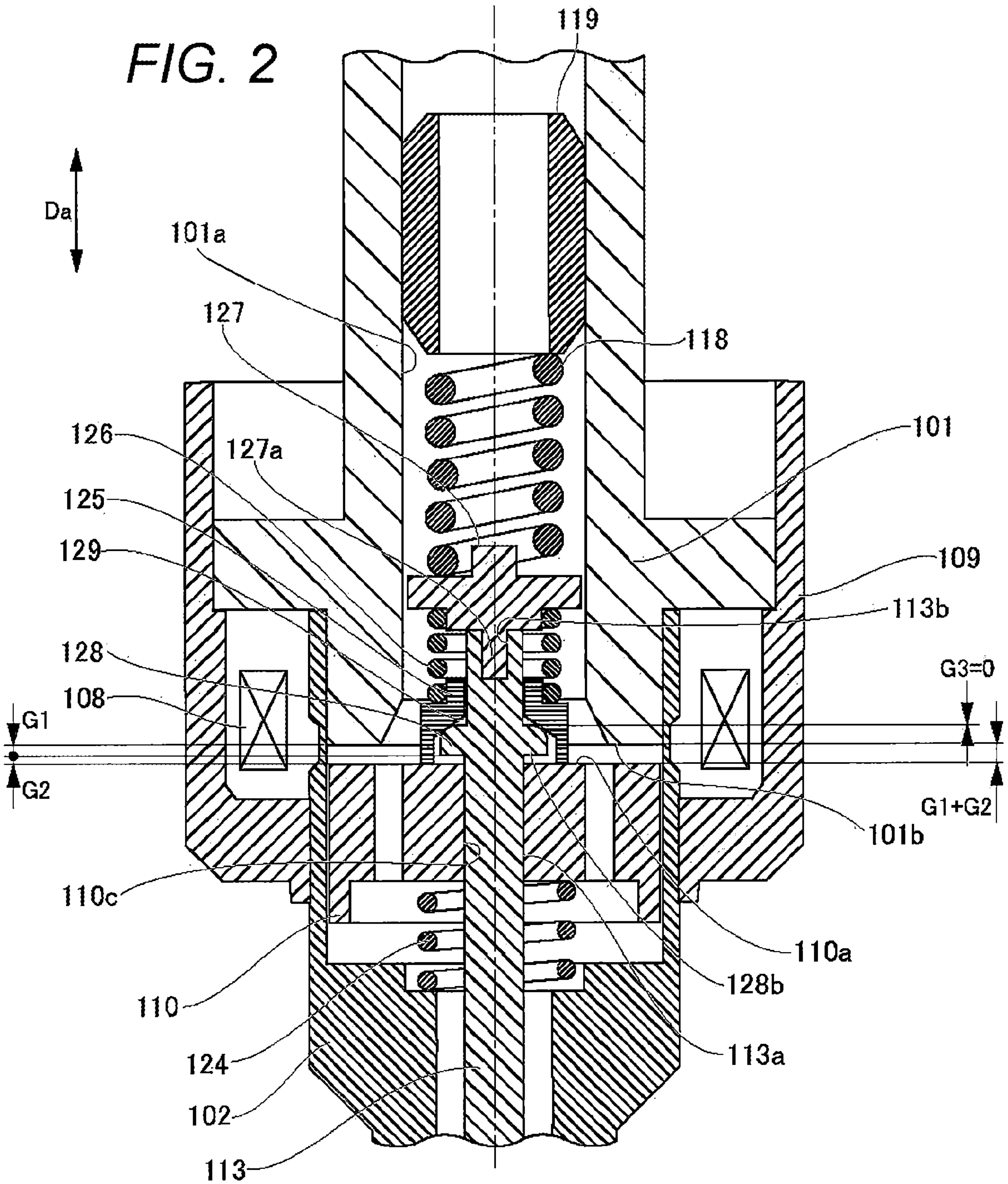
FIG. 2 is an enlarged cross-sectional view illustrating the periphery of a spacer and an anchor in the fuel injection device according to the first embodiment.

FIG. 2 is an enlarged cross-sectional view illustrating the periphery of the spacer 125 and the anchor 110 in the fuel injection device 100. Note that FIG. 2 illustrates a closed valve state.

As illustrated in FIG. 1, the plunger rod 113 is configured by a rod-like member having a columnar shape. As illustrated in FIG. 2, the plunger rod 113 is inserted through the insertion hole 110*c* of the anchor 110 and is disposed in the communication hole 102*c* (see FIG. 1) of the nozzle holder 102. As illustrated in FIG. 1, the valve body 117 is provided at the distal end portion of the plunger rod 113 in the axial direction Da. The valve body 117 is movably supported along an axial direction Dab by the guide member 105 provided to the nozzle holder 102. The valve body 117 then abuts on the valve seat 103*a* of the injection hole-forming member 103 in a separable manner, and opens and closes the injection hole 112 provided in the injection hole-forming member 103.

As illustrated in FIG. 2, the plunger rod 113 includes a shaft portion 113*a* at the distal end portion of which the valve body 117 is formed, an engaging portion 128 to be engaged with the anchor 110, and an upper shaft portion 129. The shaft portion 113*a* is formed in a columnar shape. The shaft portion 113*a* is inserted through an insertion hole 110*c* provided in the anchor 110.

An engaging portion 128 is formed on the rear end portion side in the axial direction Da with respect to the shaft portion 113*a*. The diameter of the engaging portion 128 is formed larger than the diameter of the shaft portion 113*a* and the inner diameter of the insertion hole 110*c*. The engaging portion 128 protrudes outward in the radial direction from the outer peripheral surface of the shaft portion 113*a*.

The engaging portion 128 lies opposite the upper end surface 110*a* of the anchor 110. In the closed valve state of the plunger rod 113, a gap G1 is formed between a lower end surface 128*b*, which is an end surface on one end portion side in the axial direction Da of the engaging portion 128, and the distal end portion 101*b* of the fixed core 101. Further, the lower end surface 128*b* of the engaging portion 128 lies opposite the upper end surface 110*a* at a gap G2 formed by the spacer 125 (described below). A length (G1+G2) obtained by adding together a gap G2 and a gap G1 becomes a gap between the distal end portion 101*b* of the fixed core 101 and the upper end surface 110*a* of the anchor 110, that is, a so-called magnetic attraction gap.

Figure 4:
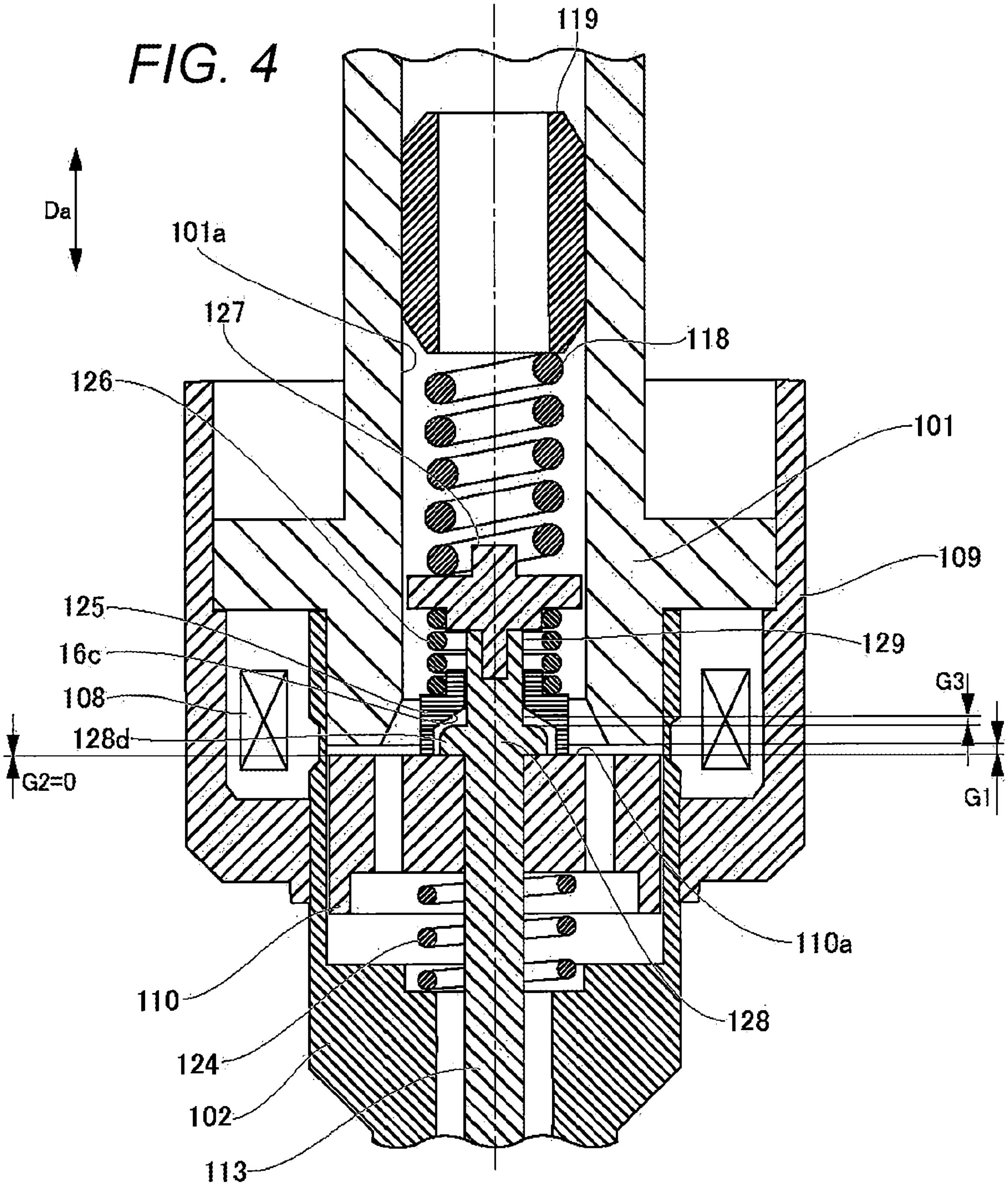
FIG. 4 is an enlarged cross-sectional view illustrating the periphery of the spacer when a preliminary stroke operation ends in the fuel injection device according to the first embodiment.
Figure 5:
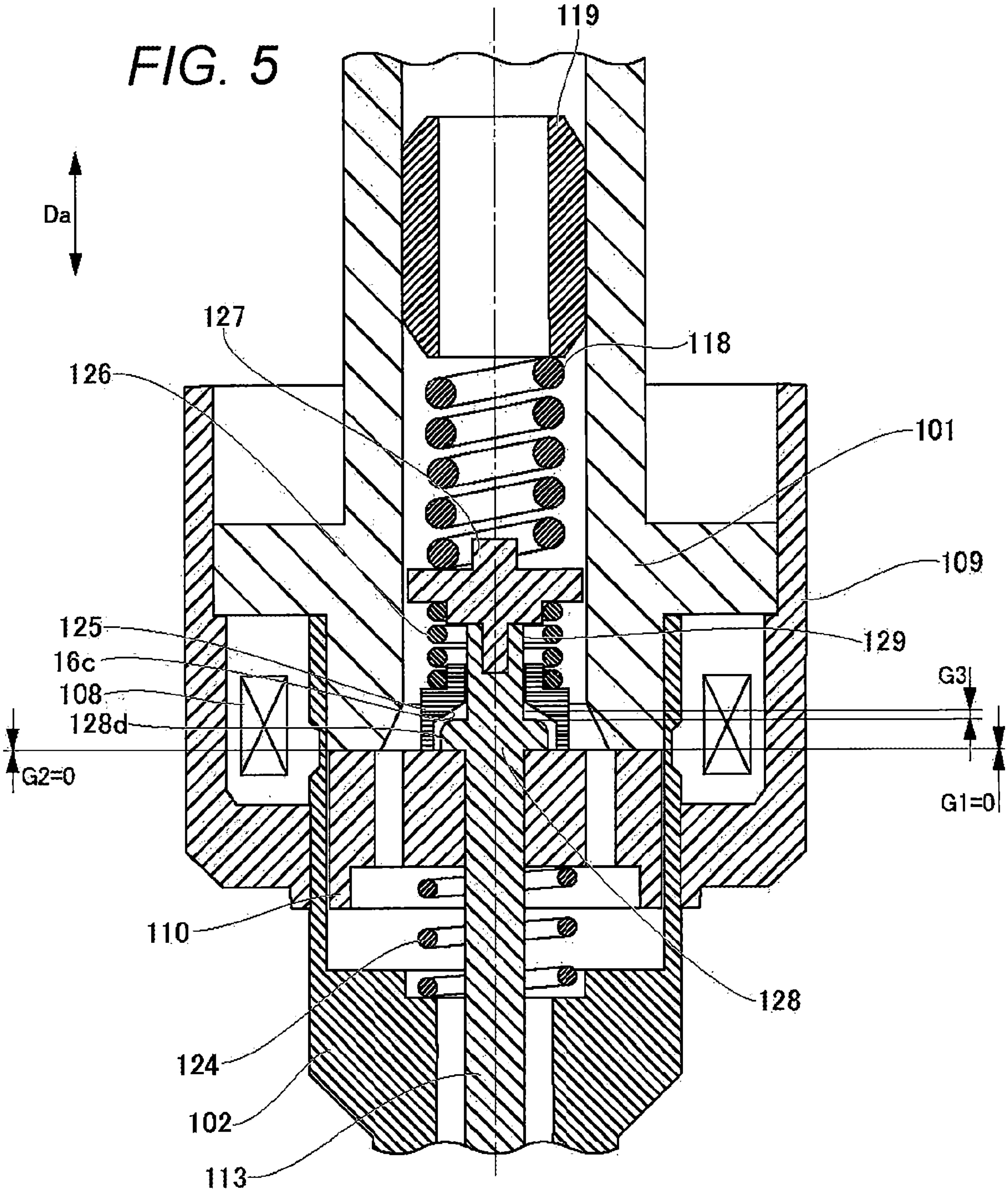
FIG. 5 is an enlarged cross-sectional view illustrating the periphery of the spacer when a valve opening operation is complete in the fuel injection device according to the first embodiment.

In addition, at the time of the valve opening operation, that is, when the positions of the anchor 110 and the plunger rod 113 are displaced relative to each other, the upper end surface 110*a* of the anchor 110 abuts on the lower end surface 128*b* of the engaging portion 128, and the anchor 110 and the engaging portion 128 engage with each other (see FIGS. 4 and 5). Thus, the plunger rod 113 moves to the rear end portion side in the axial direction Da, that is, in the valve-opening direction, together with the anchor 110. Note that a detailed configuration of the engaging portion 128 will be described below.

An upper shaft portion 129 is formed on the rear end portion side in the axial direction Da with respect to the engaging portion 128. The upper shaft portion 129 protrudes from an upper end surface 128*a*, which is an end surface on the other end portion side in the axial direction Da of the engaging portion 128, toward the rear end in the axial direction Da. The diameter of the upper shaft portion 129 is formed smaller than the diameter of the engaging portion 128. A connection recess 113*b* is formed on a rear end surface in the axial direction Da of the upper shaft portion 129. A connection protrusion 127*a* of the rod head 127 is fitted into a connection recess 113*b*.

The rod head 127 is formed in a substantially disk shape. The rod head 127 slides in the through-hole 101*a* of the fixed core 101. The connection protrusion 127*a* protruding toward a distal end in the axial direction Da is formed at an end portion on one end portion side in the axial direction of the rod head 127, that is, the distal end portion in the axial direction Da. The connection protrusion 127*a* is fitted into the connection recess 113*b* of the upper shaft portion 129. As a result, the rod head 127 is connected to the plunger rod 113.

The first spring 118 abuts on the upper end surface on the rear end side in the axial direction Da of the rod head 127. The third spring 126 abuts on the lower end surface on the distal end side in the axial direction Da of the rod head 127. The third spring 126 is interposed between the rod head 127 and a spacer 125 (described below), and biases the spacer 125 toward the anchor 110.

A detailed configuration of the engaging portion 128 and the spacer 125 will be described with reference to FIG. 3.

Figure 3:
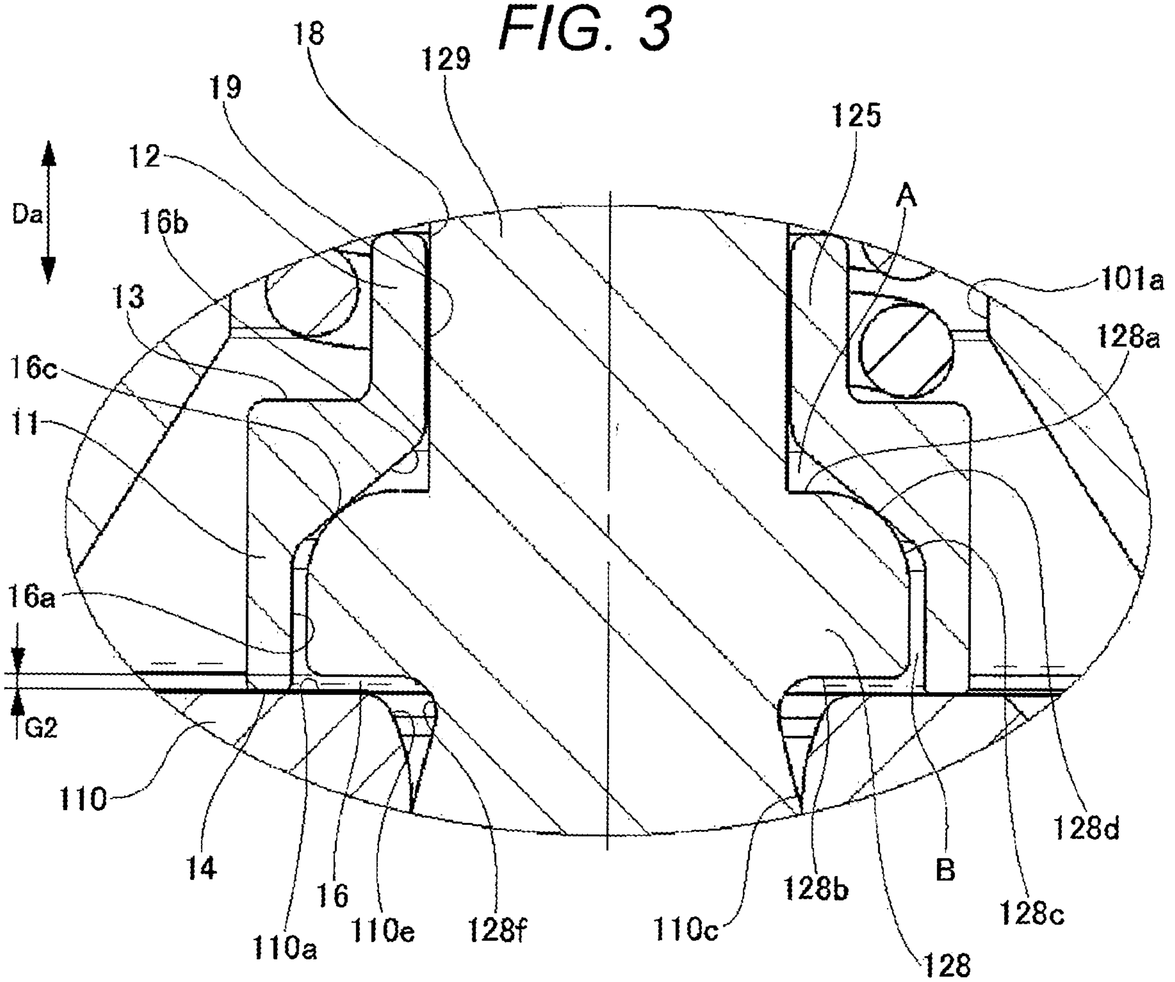
FIG. 3 is an enlarged cross-sectional view illustrating the periphery of the spacer in a closed-valve state in the fuel injection device according to the first embodiment.

FIG. 3 is an enlarged cross-sectional view of the engaging portion 128 and the spacer 125.

As illustrated in FIG. 3, the spacer 125 is formed in a substantially cylindrical shape. The spacer 125 includes a large-diameter portion 11 and a small-diameter portion 12 that serves as a guide portion. The large-diameter portion 11 and the small-diameter portion 12 are concentrically formed, and the large-diameter portion 11 is formed on the distal end side in the axial direction Da with respect to the small-diameter portion 12. The diameter of the large-diameter portion 11 is formed larger than the diameter of the small-diameter portion 12. Further, the diameter of the large-diameter portion 11 is formed smaller than the inner diameter of the through-hole 101*a* of the fixed core 101. Thus, the spacer 125 and the valve member 104 can be inserted from the fuel supply port 111 of the fixed core 101, and the assembly work of the fuel injection device 100 can be easily performed.

A small-diameter hole 18 is formed in a small-diameter portion 12. The small-diameter hole 18 penetrates from an upper end surface 15, which is an end surface on the rear end side in the axial direction Da of the spacer 125, to an accommodating portion 16 to be described below. The small-diameter hole 18 communicates with the accommodating portion 16. The upper shaft portion 129 of the plunger rod 113 is inserted into the small-diameter hole 18. The inner diameter of the small-diameter hole 18 is set larger than the diameter of the upper shaft portion 129. The spacer 125 is slidably supported by the upper shaft portion 129.

Further, a stepped surface 13 is formed at a point of the spacer 125 where the large-diameter portion 11 and the small-diameter portion 12 are connected. The stepped surface 13 protrudes substantially vertically outward in the radial direction from the outer peripheral surface of the small-diameter portion 12. The distal end portion side of the third spring 126 in the axial direction Da abuts on the stepped surface 13. The third spring 126 biases the spacer 125 toward the anchor 110. Therefore, the lower end surface 14, which is the end surface on the distal end portion side in the axial direction Da of the spacer 125, abuts on the upper end surface 110*a* of the anchor 110.

Note that, in the present example, an example in which the third spring 126 is provided has been described, but the present invention is not limited thereto, and the third spring 126 need not be provided.

The accommodating portion 16 is formed in the large-diameter portion 11. The accommodating portion 16 is a recess recessed from the lower end surface 14 of the spacer 125 toward the stepped surface 13. The engaging portion 128 of the plunger rod 113 is accommodated in the accommodating portion 16.

The inner diameter of the accommodating portion 16 is set larger than the diameter of the engaging portion 128 of the plunger rod 113. Therefore, a gap is formed between the outer peripheral surface on the outer side in the radial direction of the engaging portion 128 and an inner wall surface 16*a* of the accommodating portion 16. A gap between the inner wall surface 16*a* of the accommodating portion 16 and the outer peripheral surface of the engaging portion 128 is preferably formed larger than a gap between the inner wall surface 19 of the small-diameter hole 18 of the small-diameter portion 12 and the upper shaft portion 129.

A tapered portion 16*b* is formed at a point where the inner wall surface 19 of the small-diameter hole 18 and the inner wall surface of the accommodating portion 16 are connected. That is, the inner diameter of the accommodating portion 16 on the small-diameter portion 12 side is continuously formed larger toward the distal end portion side in the axial direction Da. The tapered portion 16*b* lies opposite the upper end surface 128*a* of the engaging portion 128. Here, a corner portion of the engaging portion 128 on the upper end surface 128*a* side is formed having a curved R-surface portion 128*c*. The tapered portion 16*b* of the accommodating portion 16 abuts on the R-surface portion 128*c* of the engaging portion 128.

In this manner, by providing the tapered portion 16*b* formed in a tapered shape at the corner portion of the inner wall of the accommodating portion 16 and providing the R-surface portion 128*c* formed by rounding the corner portion of the engaging portion 128, the abutment positions 16*c* and 128*d* in which the engaging portion 128 and the accommodating portion 16 abut on each other make line contact. Thus, the surface area over which the engaging portion 128 and the accommodating portion 16 abut on each other can be reduced.

The length from the lower end surface 14 of the accommodating portion 16 to the abutment position 16*c* where the tapered portion 16*b* abuts on the R-surface portion 128*c* of the engaging portion 128 is formed larger than the length from the abutment position 128*d* where the R-surface portion 128*c* of the engaging portion 128 abuts on the tapered portion 16*b* to the lower end surface 128*b*.

Note that, in the present example, an example in which the tapered portion 16*b* is provided to the accommodating portion 16 and the R-surface portion 128*c* is provided to the engaging portion 128 has been described, but the present invention is not limited thereto. For example, an R surface portion of which corner portions of the inner wall of the accommodating portion 16 are rounded may be provided, and the corner portions of the engaging portion 128 may be formed in a tapered shape.

Here, the anchor 110 is biased toward the fixed core 101 by the biasing force of the second spring 124. Therefore, the upper end surface 110*a* of the anchor 110 abuts on the lower end surface 14 of the spacer 125. Note that the biasing force of the second spring 124 is set smaller than the biasing force of the third spring 126. Hence, the anchor 110 is biased toward the distal end side in the axial direction Da by the third spring 126 via the spacer 125. Thus, the movement of the anchor 110 toward the rear end side in the axial direction Da, that is, the movement in the valve opening direction, is restricted by the spacer 125 and the third spring 126.

In the closed valve state, the tapered portion 16*b* of the accommodating portion 16 abuts on the R-surface portion 128*c* of the engaging portion 128 of the plunger rod 113, and thus the spacer 125 is disposed in a predetermined position (reference position). In a state where the spacer 125 is disposed at the reference position, the lower end surface 14 of the spacer 125 abuts on the upper end surface 110*a* of the anchor 110. Thus, a gap G2, a so-called preliminary stroke, can be provided between the lower end surface 128*b* of the plunger rod 113 and the upper end surface 110*a* of the anchor 110. That is, the spacer 125 forms a predetermined gap G2 serving as a preliminary stroke between the anchor 110 and the engaging portion 128 of the plunger rod 113.

As described above, when the plunger rod 113 is in the closed valve state, the gap G1 is formed between the lower end surface 128*b* of the engaging portion 128 and the distal end portion 101*b* of the fixed core 101. A length (G1+G2) obtained by adding together a gap G2 and a gap G1 becomes a gap between the distal end portion 101*b* of the fixed core 101 and the upper end surface 110*a* of the anchor 110, that is, a so-called magnetic attraction gap.

In the closed valve state, a first region A and a second region B are formed between the engaging portion 128 and the spacer 125 so as to have the abutment positions 16*c* and 128*d* interposed therebetween. The first region A is a space surrounded by the upper shaft portion 129, the upper end surface 128*a* of the engaging portion 128, the R-surface portion 128*c*, and the tapered portion 16*b* of the accommodating portion 16. The second region B is a space surrounded by the inner wall surface 16*a* of the accommodating portion 16, the outer peripheral surface of the engaging portion 128, the lower end surface 128*b*, and the upper end surface 110*a* of the anchor 110. The first region A and the second region B become substantially closed spaces due to the closed valve state. The first region A and the second region B are preferably set larger than a gap between the upper shaft portion 129 of the plunger rod 113 and the inner wall surface 19 of the small-diameter hole 18.

The abutment positions 16*c* and 128*d*, which are boundaries between the first region A and the second region B, are tapered portions 16*b* in which the accommodating portion 16 is formed in a tapered shape as described above, and the engaging portion 128 is an R-surface portion 128*c* formed in an R-surface shape. Therefore, the abutment surface areas of the abutment positions 16*c* and 128*d* can be made extremely small. Further, the shapes of the accommodating portion 16 and the engaging portion 128 are formed smooth toward the abutment positions 16*c* and 128*d*. Thus, the inlet loss of the fluid toward the abutment positions 16*c* and 128*d* can be reduced, and the fluid can efficiently flow into the abutment positions 16*c* and 128*d*.

A point of the engaging portion 128 connected to the shaft portion 113*a* is formed having a reduced diameter portion 128*f* of a reduced diameter. Further, an end portion 110*e* of the insertion hole 110*c* of the anchor 110 on the upper end surface 110*a* (see FIG. 2) side is formed having a larger diameter toward the rear end side in the axial direction Da. Thus, the volume of the second region B can be increased while securing the contact surface area between the engaging portion 128 and the anchor 110.

1-3. Operation Example of Fuel Injection Device

Next, an operation example of the fuel injection device 100 having the above-described configuration will be described with reference to FIGS. 2, 4, and 5.

FIG. 4 is a cross-sectional view showing the periphery of the spacer 125 when the valve opening operation starts, and FIG. 5 is a cross-sectional view showing the periphery of the spacer 125 when the valve opening operation ends.

When the electromagnetic coil 108 is energized by the ECU, a magnetic flux flows through a magnetic circuit formed by the fixed core 101, the anchor 110, the nozzle holder 102, and the housing 109. A magnetic attraction force for attracting the anchor 110 is then generated in the fixed core 101. When the magnetic attraction force of the fixed core 101 exceeds the biasing force of the third spring 126, the anchor 110 presses the spacer 125 and moves toward the fixed core 101. Therefore, both the anchor 110 and the spacer 125 move toward the rear end side in the axial direction Da. During this time, the distal end portion of the plunger rod 113 abuts on the valve seat 103*a* of the injection hole-forming member 103.

When the anchor 110 moves to the rear end side in the axial direction Da, the upper end surface 110*a* of the anchor 110 engages with the engaging portion 128 of the plunger rod 113 as illustrated in FIG. 4. Therefore, the gap G2 between the upper end surface 110*a* of the anchor 110 and the lower end surface 128*b* of the engaging portion 128 is zero.

In addition, the size of the gap (magnetic attraction gap) between the anchor 110 and the fixed core 101 decreases by the amount of movement of the anchor 110 to the rear end side in the axial direction Da, and in the example illustrated in FIG. 4, the magnetic attraction gap has a length G1. Furthermore, because the spacer 125 also moves to the rear end side in the axial direction Da, a gap G3 is generated between the abutment position 16*c* of the tapered portion 16*b* of the accommodating portion 16 and the abutment position 128*d* of the R-surface portion 128*c* of the engaging portion 128.

Further, immediately before starting the valve opening operation, a gap G2 is formed between the anchor 110 and the engaging portion 128. Therefore, the anchor 110 abuts on the engaging portion 128 after moving through the gap G2. Thus, the anchor 110 accelerates until same abuts on the engaging portion 128, that is, while moving in the gap G2. As a result, the anchor 110 can made to abut on the engaging portion 128 in a state where the anchor 110 is accelerated.

In this manner, the force applied to the plunger rod 113 from the anchor 110 via the engaging portion 128 can be increased, and the movement of the plunger rod 113 toward the rear end side in the axial direction Da can be promptly started. As a result, the valve opening operation of the plunger rod 113 can be promptly started.

As illustrated in FIG. 5, when the anchor 110, the spacer 125, and the plunger rod 113 move further to the rear end side in the axial direction Da, the distal end portion of the plunger rod 113 is separated from the valve seat 103*a* of the injection hole-forming member 103, and enters an open valve state in which the injection hole 112 is opened. Thus, fuel is injected from the injection hole 112.

In addition, because the upper end surface 110*a* of the anchor 110 abuts on the distal end portion 101*b* of the fixed core 101, the movement of the anchor 110 toward the rear end side in the axial direction Da is restricted. Note that the plunger rod 113 moves to the rear end side in the axial direction Da under an inertial force, but is pushed back by the biasing force of the first spring 118. Therefore, as illustrated in FIG. 5, the plunger rod 113 stops in a state where the lower end surface 128*b* of the engaging portion 128 abuts on the upper end surface 110*a* of the anchor 110. Thus, an open valve stationary state is assumed as a result of the plunger rod 113 moving by a predetermined stroke amount (the gap G1 illustrated in FIG. 2).

In the open valve stationary state, the anchor 110 is attracted to the fixed core 101 by the magnetic attraction force, and the valve member 104 is biased in the valve closing direction by the biasing force of the first spring 118. Therefore, the anchor 110 and the plunger rod 113 abut on each other and become integrated. That is, the lower end surface 128*b* of the engaging portion 128 of the plunger rod 113 abuts on the upper end surface 110*a* of the anchor 110, and the size of the gap G2 becomes zero.

Furthermore, because the biasing force of the third spring 126 is smaller than the magnetic attraction force, the third spring 126 cannot push back the anchor 110 to the distal end side in the axial direction Da via the spacer 125. Therefore, the lower end surface 14 of the spacer 125 abuts on the upper end surface 110*a* of the anchor 110. The gap G3 formed between the abutment position 128*d* of the R-surface portion 128*c* of the engaging portion 128 and the abutment position 16*c* of the tapered portion 16*b* of the accommodating portion 16 in the spacer 125 is then maintained. Furthermore, because the anchor 110 abuts on the fixed core 101, the size of the gap G1 between the upper end surface 110*a* of the anchor 110 and the distal end portion 101*b* of the fixed core 101 becomes zero.

When the drive pulse is turned off in the opened valve state (full lift state) illustrated in FIG. 5, the energization to the electromagnetic coil 108 is cut off. Therefore, the magnetic attraction force generated between the anchor 110 and the fixed core 101 disappears. When the magnetic attraction force becomes smaller than the biasing force of the first spring 118, the valve member 104 starts to move toward the distal end side in the axial direction Da, that is, in the valve closing direction. The valve member 104 that has started to move in the valve closing direction is displaced integrally with the anchor 110 and displaced by the length G1, whereupon the distal end portion of the plunger rod 113 is seated on the valve seat 103*a*. Thus, the state returns to the closed valve state illustrated in FIG. 2, and the fuel injection by the fuel injection device 100 is stopped.

When the spacer 125 moves during the valve opening operation and the valve closing operation of the fuel injection device 100, the volumes of the first region A and the second region B change. Therefore, a force generated by a pressure fluctuation in the first region A and the second region B acts on the spacer 125. Note that, not only the pressure in the first region A and the second region B but also a force generated by shearing of the fuel (fluid) flowing around the spacer 125 act on the spacer 125. Here, the pressure and the shearing force of the fluid are collectively referred to as a fluid force. However, the fluid force acting on the spacer 125 is dominated by the pressure of the low pressure portion rather than the shearing force of the fluid.

Here, at the time of the valve opening operation, the engaging portion 128 may stick to the inner wall surface of the accommodating portion 16 of the spacer 125 due to the pressure fluctuation in the first region A and the second region B, which may affect the movement of the spacer 125. In contrast, in the fuel injection device 100 of this example, as described above, the tapered portion 16*b* is provided to the accommodating portion 16, the R-surface portion 128*c* is provided to the engaging portion 128, and the abutment positions 16*c* and 128*d* of the accommodating portion 16 and the engaging portion 128 are brought into line contact with each other. Thus, the contact surface areas of the abutment positions 16*c* and 128*d* where the sticking phenomenon occurs can be reduced, and the force with which the engaging portion 128 sticks to the accommodating portion 16 caused by the fluid force can be reduced.

Furthermore, the size of the low pressure portion and the dimension of the sliding portion, for example, the gap between the upper shaft portion 129 and the small-diameter hole 18 are different for each individual device, that is, for each fuel injection device, due to variations at the time the fuel injection device is manufactured. For this reason, the fluid force, that is, the amount of change in pressure of the low pressure portion and the dimension of the gap of the sliding portion vary between individual devices, and variations in the valve opening timing and the valve opening speed of the plunger rod 113 also arise. As a result, in the conventional fuel injection device, the injection amount varies for each fuel injection device.

In contrast, in the case of the first region A and the second region B, the first region A and the second region B are formed larger than the gap between the upper shaft portion 129 of the plunger rod 113 and the inner wall surface 19 of the small-diameter hole 18, and it is thus possible to reduce variations between individual devices in the fluid force caused by variations at the time of manufacturing.

As described above, the accommodating portion 16 and the engaging portion 128 are formed smooth toward the abutment positions 16*c* and 128*d*. Thus, the inlet loss of the fluid toward the abutment positions 16*c* and 128*d* can be reduced, and the fluid can be made to flow efficiently into the abutment positions 16*c* and 128*d*.

As described above, because the fluid force acting on the spacer 125 can be reduced, even in a case where the volume of the first region A and the second region B varies for each individual device, variations in the valve opening timing and the valve opening speed of the plunger rod 113 and the spacer 125 can be suppressed. As a result, variations in the injection amounts of the fuel injection device 100 can be suppressed.

2. Second Embodiment

Next, a fuel injection device according to a second embodiment will be described with reference to FIG. 6.

Figure 6:
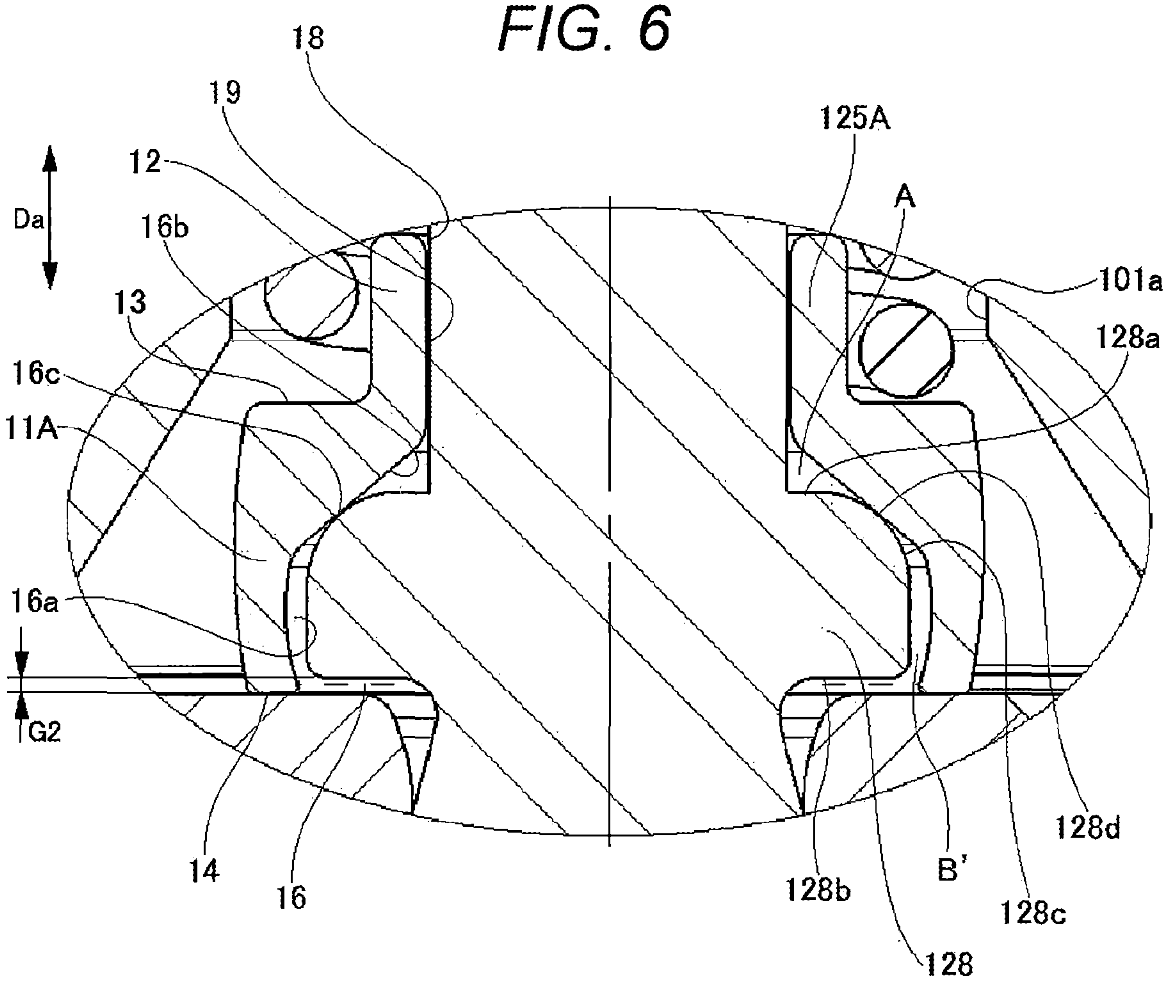
FIG. 6 is an enlarged cross-sectional view illustrating the periphery of the spacer in the fuel injection device according to a second embodiment.

FIG. 6 is an enlarged cross-sectional view illustrating the periphery of the spacer in the fuel injection device according to the second embodiment.

The fuel injection device according to the second embodiment is different from the fuel injection device 100 according to the first embodiment with regard to the shape of the large-diameter portion 11A of a spacer 125A. Therefore, here, the same reference signs are assigned to portions common to those of the fuel injection device 100 according to the first embodiment, and redundant descriptions will be omitted.

As illustrated in FIG. 6, the spacer 125A includes a small-diameter portion 12 and a large-diameter portion 11A. The configuration of the small-diameter portion 12 is the same as that of the small-diameter portion 12 of the fuel injection device 100 according to the first embodiment, and hence a description thereof will be omitted.

The large-diameter portion 11A is formed in a substantially cylindrical shape. An accommodating portion 16 that accommodates the engaging portion 128 is formed in the large-diameter portion 11A. In addition, an intermediate portion of the large-diameter portion 11A in the axial direction bulges outward in the radial direction. Therefore, in the accommodating portion 16 formed in the large-diameter portion 11A, the diameter of the intermediate portion is formed larger than the opening diameter on the rear end side in the axial direction Da.

Thus, according to the fuel injection device according to the second embodiment, the volume of a second region B' can be made larger than that of the fuel injection device 100 according to the first embodiment. Thus, it is possible to suppress pressure fluctuations in the second region B' during the valve opening operation and the valve closing operation. As described above, the fluid force acting on the spacer 125A is dominated by the fluid pressure rather than the fluid shearing force. As a result, the fuel injection device according to the second embodiment enables the fluid force acting on the spacer 125A to be reduced more than the fuel injection device 100 according to the first embodiment.

Furthermore, by making the diameter of the intermediate portion in the axial direction of the large-diameter portion 11A larger than that on the rear end side, the volume of the second region B' can be increased without reducing the gap from the through-hole 101*a* of the fixed core 101 in the open valve state. Thus, it is possible to suppress an increase in the pressure loss of the fluid flowing through the through-hole 101*a* of the fixed core 101 and the outer peripheral portion of the spacer 125A.

Because the other configurations are similar to those of the fuel injection device 100 according to the first embodiment, descriptions thereof will be omitted. Such a fuel injection device including the spacer 125A also affords the same actions and effects as those of the fuel injection device 100 according to the first embodiment described above.

Note that, in the fuel injection device according to the second embodiment, an example has been described in which, in order to increase the second region B', a bulging portion expanding radially outward is formed in a portion of the large-diameter portion 11A of the spacer 125A, but the present invention is not limited thereto. For example, the second region B' may be enlarged by recessing, inward in the radial direction, a portion of a radially outer lateral surface portion of the engaging portion 128. Alternatively, a portion of the large-diameter portion 11A of the spacer 125A may bulge outward, and a portion of the lateral surface portion of the engaging portion 128 may be recessed inward.

3. Third Embodiment

Next, a fuel injection device according to a third embodiment will be described with reference to FIG. 7.

Figure 7:
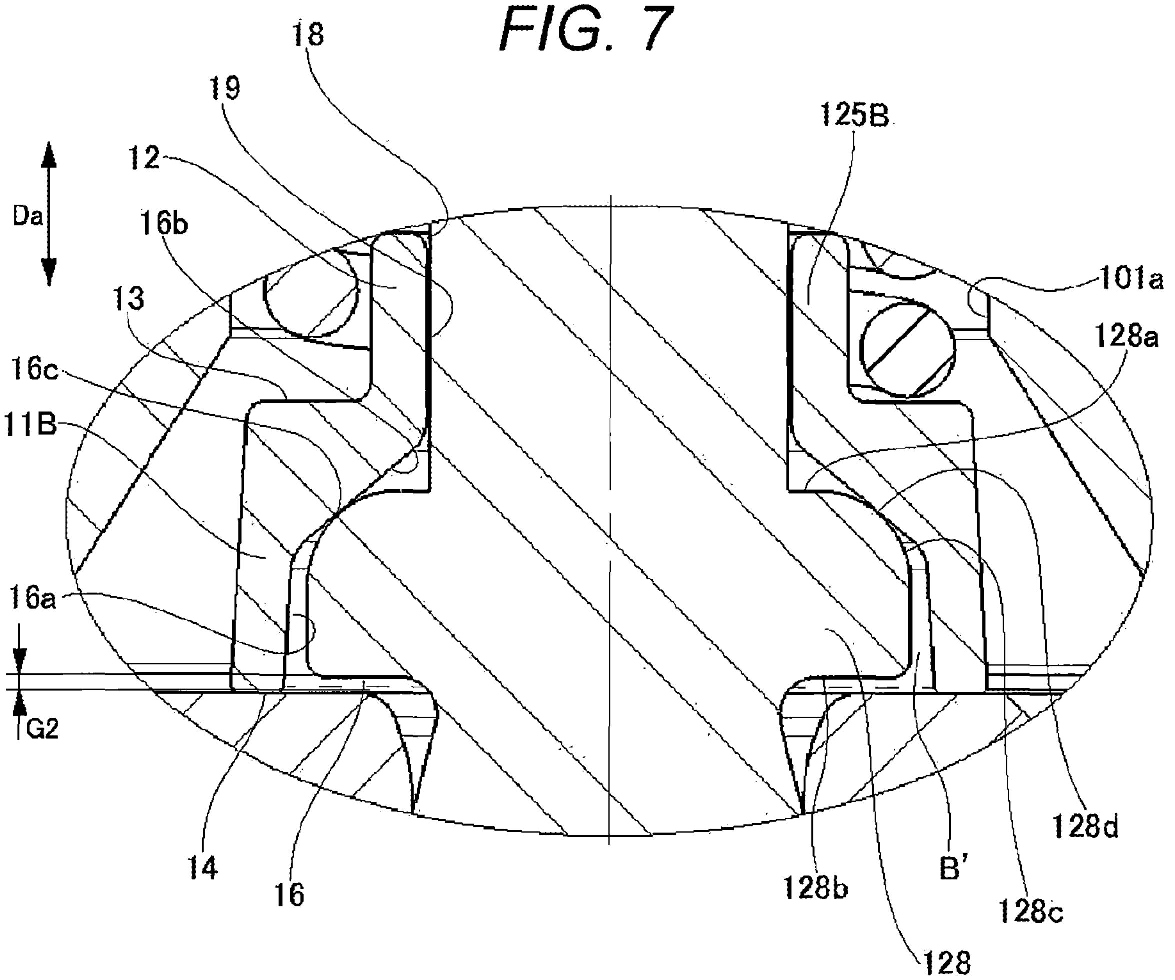
FIG. 7 is an enlarged cross-sectional view illustrating the periphery of the spacer in the fuel injection device according to a third embodiment.

FIG. 7 is an enlarged cross-sectional view illustrating the periphery of the spacer in the fuel injection device according to the third embodiment.

The fuel injection device according to the third embodiment is different from the fuel injection device 100 according to the first embodiment with regard to the shape of the large-diameter portion of the spacer. Therefore, here, the same reference signs are assigned to portions common to those of the fuel injection device 100 according to the first embodiment, and redundant descriptions will be omitted.

As illustrated in FIG. 7, the spacer 125B includes a small-diameter portion 12 and a large-diameter portion 11B. The configuration of the small-diameter portion 12 is the same as that of the small-diameter portion 12 of the fuel injection device 100 according to the first embodiment, and hence a description thereof will be omitted.

In addition, the large-diameter portion 11B is formed such that the diameter thereof increases continuously from the rear end portion toward the distal end portion side in the axial direction Da. Note that the largest outer diameter of the large-diameter portion 11B is formed smaller than the inner diameter of the through-hole 101*a* of the fixed core 101. Thus, the spacer 125B and the valve member 104 can be inserted from the fuel supply port 111 of the fixed core 101, and the assembly work of the fuel injection device 100 can be easily performed.

Similarly to the fuel injection device according to the second embodiment, such a fuel injection device including the spacer 125B also enables the volume of the second region B' to be increased.

Because the other configurations are similar to those of the fuel injection device 100 according to the first embodiment, descriptions thereof will be omitted. Such a fuel injection device including the spacer 125B also affords the same actions and effects as those of the fuel injection device 100 according to the first embodiment described above.

Note that the present invention is not limited to the embodiments described above and illustrated in the drawings, and various modifications can be made without departing from the spirit of the invention disclosed in the claims.

In the above-described embodiments, examples were described in which the position where the accommodating portion and the engaging portion abut on each other is formed in a tapered shape or a curved surface shape, and the accommodating portion and the engaging portion are in line contact with each other, but the present invention is not limited to such examples. A projection may be provided at any one of the corner portions where the accommodating portion and the engaging portion lie opposite each other, and thus the accommodating portion and the engaging portion may be brought into point contact with each other. Accordingly, the contact surface area between the accommodating portion and the engaging portion can be further reduced, and the accommodating portion and the engaging portion can be prevented from sticking during the valve opening operation.

Note that, in the present specification, words such as "parallel" and "orthogonal" are used, but these words do not strictly mean only "parallel" and "orthogonal", and may denote "substantially parallel" or "substantially orthogonal" states that include "parallel" and "orthogonal", within a scope enabling the corresponding functions to be afforded.

REFERENCE SIGNS LIST

11, 11A, 11B large-diameter portion
12 small-diameter portion
13 stepped surface
14 lower end surface
15 upper end surface
16 accommodating portion
16*a* inner wall surface
16*b* tapered portion
16*c* abutment position
18 small-diameter hole
19 inner wall surface
100 fuel injection device
101 fixed core
101*a* through-hole
102 nozzle holder
102*a* large-diameter portion
102*b* accommodating recess
102*c* communication hole
103 injection hole-forming member
103*a* valve seat
104 valve member

105 guide member
106 seal member
107 protective member
108 electromagnetic coil
109 housing
110 anchor
110*a* upper end surface
110*c* insertion hole
110*e* end portion
111 fuel supply port
112 injection hole
113 plunger rod
113*a* shaft portion
113*b* connection recess
114 upstream outer peripheral portion
117 valve body
118 first spring
119 adjustment member
124 second spring
125, 125A, 125B spacer
126 third spring
127 rod head
128 engaging portion
128*a* upper end surface
128*b* lower end surface
128*c* R surface portion
128*d* abutment position
128*f* reduced diameter portion
129 upper shaft portion

The invention claimed is:

1. A fuel injection device, comprising:

a nozzle holder where an injection hole-forming member is provided;

a fixed core disposed in the nozzle holder;

an anchor disposed opposite the fixed core; and a valve member movably disposed in the nozzle holder, wherein the valve member includes:

a plunger rod provided with a shaft portion that opens and closes an injection hole provided in the injection hole-forming member, and an engaging portion that engages with the anchor during a valve opening operation, and a spacer having an accommodating portion in which the engaging portion is accommodated and forming a predetermined gap between the engaging portion and the anchor when the valve is closed, an upper shaft portion having a smaller diameter than a diameter of the engaging portion is provided on a rear end portion side of the plunger rod in the axial direction with respect to the engaging portion of the plunger rod, the spacer includes:

a small-diameter portion in which is formed a small-diameter hole into which the upper shaft portion provided to the plunger rod is inserted, a large-diameter portion where the accommodating portion is formed and which is formed larger than the diameter of the small-diameter portion, and a stepped surface connecting the small-diameter portion and the large-diameter portion, a gap between the accommodating portion and the engaging portion is formed larger than a gap between the small-diameter portion and the upper shaft portion, and the accommodating portion and the engaging portion are in line contact or point contact.

2. The fuel injection device according to claim 1, wherein either one of points of contact of the accommodating portion and the engaging portion is formed in a tapered shape, while another is formed in a curved surface shape.

3. The fuel injection device according to claim 1, wherein a first region and a second region are formed between the accommodating portion and the engaging portion so as to have an abutment position of mutual abutment interposed therebetween, the first region is a space surrounded by the upper shaft portion, an upper end surface of the engaging portion, and the accommodating portion, the second region is a space surrounded by an inner wall surface of the accommodating portion, an outer peripheral surface of the engaging portion, a lower end surface of the engaging portion, and the anchor, and the first region and the second region are formed larger than the gap between the small-diameter portion and the upper shaft portion.

4. The fuel injection device according to claim 1, wherein a diameter of the large-diameter portion is formed smaller than an inner diameter of a through-hole formed in the fixed core and through which the valve member is inserted.

5. The fuel injection device according to claim 4, wherein the large-diameter portion is formed such that an intermediate portion in an axial direction thereof bulges outward in a radial direction.

6. The fuel injection device according to claim 4, wherein a portion of a radially outer lateral surface portion of the engaging portion is formed recessed radially inward.

7. The fuel injection device according to claim 4, wherein the large-diameter portion is formed such that the diameter thereof increases continuously from the rear end portion toward a distal end portion in the axial direction.

* * * * *